United States Patent

Hartman

[11] Patent Number: 5,916,288
[45] Date of Patent: Jun. 29, 1999

[54] MULTI-FUNCTIONAL CONTROL SWITCH ARRANGEMENT

[75] Inventor: Hollister A. Hartman, Northville, Mich.

[73] Assignee: UT Automotive Dearborn, Inc., Dearborn, Mich.

[21] Appl. No.: 08/707,153

[22] Filed: Sep. 3, 1996

[51] Int. Cl.⁶ .................................................... G06F 7/00
[52] U.S. Cl. ............................................. 701/36; 340/461
[58] Field of Search .................................... 701/1, 36, 48, 701/49; 307/9.1, 10.1; 340/461; 455/575, 90; 345/112, 121, 123

[56] References Cited

U.S. PATENT DOCUMENTS

| | | |
|---|---|---|
| 4,321,437 | 3/1982 | Cryer . |
| 4,787,040 | 11/1988 | Ames et al. ................................. 701/1 |
| 5,149,924 | 9/1992 | Priesemuth . |
| 5,270,689 | 12/1993 | Hermann .................................. 345/145 |
| 5,519,256 | 5/1996 | Goodridge . |
| 5,581,058 | 12/1996 | Javery et al. . |
| 5,592,029 | 1/1997 | Hollstein et al. . |
| 5,640,056 | 6/1997 | Setzer et al. ............................... 701/36 |

FOREIGN PATENT DOCUMENTS

| | | |
|---|---|---|
| 0366132A2 | 10/1989 | European Pat. Off. . |
| 0701926A2 | 3/1996 | European Pat. Off. . |
| 4135363A1 | 4/1993 | Germany . |

*Primary Examiner*—William A. Cuchlinski, Jr.
*Assistant Examiner*—Gertrude Arthur
*Attorney, Agent, or Firm*—Howard & Howard

[57] ABSTRACT

A graphical user interface system for use in a vehicle includes a series of selection switches, multi-purpose adjustment switch and control switches. The selection switches enable a user to choose a vehicle subsystem and a display screen instantaneously displays the subsystem and all adjustable functions associated with that system. The adjustment switches are utilized to adjust the functions of the subsystem to change the operation. The arrangement and selection of the adjustment switches and the display strategy enable a user to readily adjust all of the functions of a particular subsystem using a minimum number of switches and without having to page through various menu screens.

20 Claims, 4 Drawing Sheets

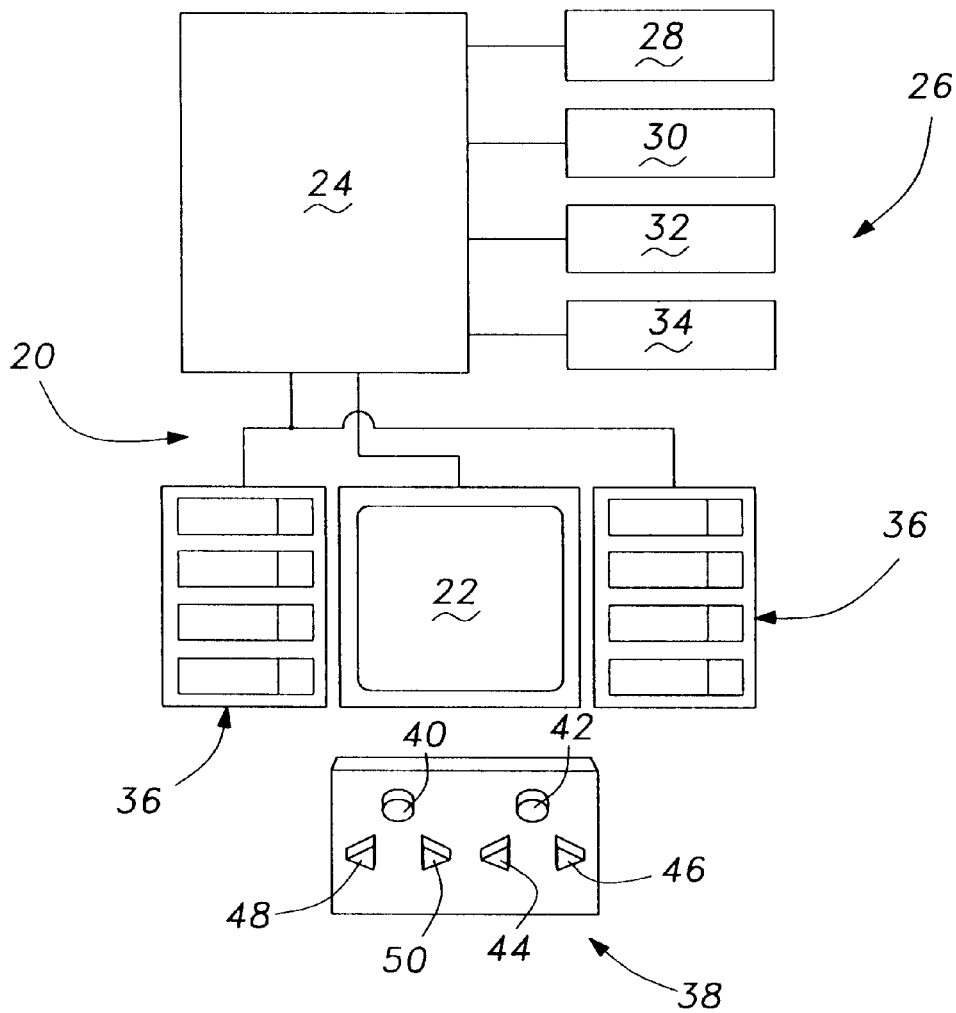
_Fig-1_
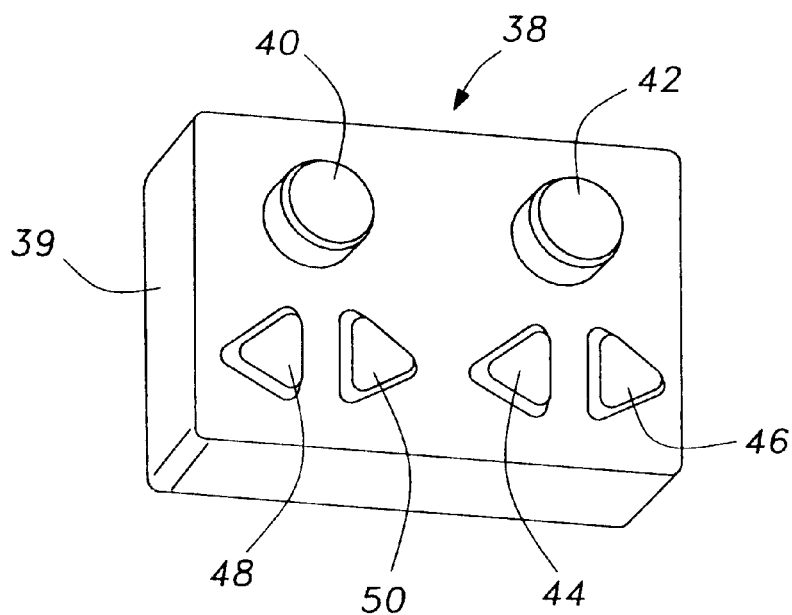
_Fig-2_

MULTI-FUNCTIONAL CONTROL SWITCH ARRANGEMENT

BACKGROUND OF THE INVENTION

This invention relates to a graphical user interface for use inside of vehicles. More particularly, this invention relates to an arrangement of control switches for interfacing with a graphical user interface that provides a user visual access to a variety of features associated with a subsystem of a vehicle without requiring the user to page through a series of menus to access those functions.

A variety of graphical user interfaces have been developed for facilitating a user's access and control of electronic products and systems. More recently, attempts have been made to integrate graphical user interfaces into vehicles. Incorporating a graphical user interface into a vehicle presents special problems. One problem is provided an efficient number and arrangement of control switches.

Another difficulty in vehicles is the limitation on available space to place control switches. Therefore, there is a need for a multipurpose arrangement of a relatively low number of control switches for interfacing with the electronic systems.

This invention addresses the need for a graphical user interface that is readily and easily used by a driver of a vehicle. The arrangement of controls and screen displays associated with this invention provide a driver or user of the system with convenient, accurate and simple access to a variety of adjustable functions associated with various subsystems on the vehicle.

SUMMARY OF THE INVENTION

In general terms, this invention is a device for interfacing with an electronic control system. The inventive device includes a multi-purpose adjustment switch that is moveable in a first mode where the switch is rotated about an axis of rotation. The multi-purpose adjustment switch is also moveable in a second mode where the switch is pressed to move longitudinally along the axis of rotation. Two control switches are also included that are moveable between two positions, respectively. Moving the adjustment switch knob or the control switches cause the electronic control system to respond accordingly.

In the preferred embodiment, the multi-purpose adjustment switch and control switches are supported on a housing in a spaced relationship that yields them easily moveable by a user of the inventive device. Moreover, a display screen includes a visual representation of the physical layout of the switches with associated functions.

The various features and advantages of this invention will become apparent to those skilled in the art from the following detailed description of a preferred embodiment. The drawings that accompany the detailed description can be described as follows.

BRIEF DESCRIPTION OF THE DRAWINGS

FIG. 1 is a schematic illustration of a graphical user interface system designed according to this invention.

FIG. 2 is a diagrammatic illustration of an arrangement of control switches designed according to this invention.

DETAILED DESCRIPTION OF THE PREFERRED EMBODIMENT

Figure 3:
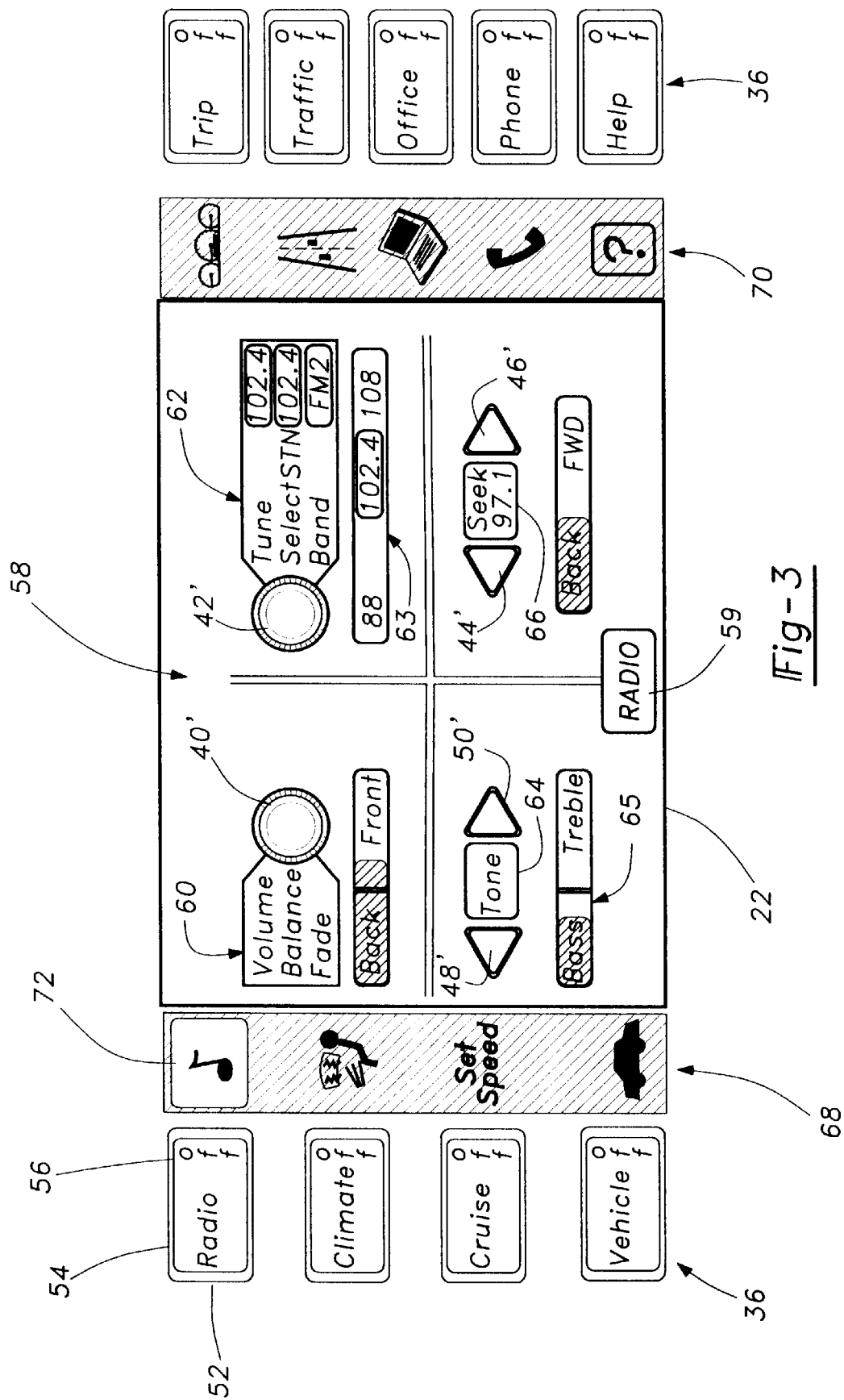
FIG. 3 is a diagrammatic illustration of a screen display associated with this invention.

FIG. 1 illustrates a graphical user interface system 20 that is designed to be placed within a vehicle. A display screen 22 displays a variety of information for a driver and/or passenger of a vehicle. An electronic controller 24 controls what is shown on the display screen 22. The electronic controller 24 is coupled to a plurality of vehicle subsystems 26. Examples of subsystems include a radio 28, a cruise control 30, the heating, ventilation and air conditioning (HVAC) system 32 and a cellular telephone 34. The various subsystems of the vehicle are schematically illustrated in block diagram form because the subsystems themselves are conventional.

A plurality of selection switches 36 enable a user to select one of the subsystems to be adjusted. The selection switches 36 preferably are three-position rocker switches. Pressing an appropriate side of a selected switch will cause the associated vehicle subsystem to be displayed on the screen 22.

FIG. 2 illustrates, in more detail, the presently preferred arrangement of a set of switches 38 that enable a user of the system to modify the operation of a selected subsystem. The switches 38 are supported on the housing 39. In the preferred embodiment, two multi-purpose adjustment switches 40 and 42 are included. The adjustment switches 40 and 42 preferably are push-turn knobs that can be pressed or rotated. The adjustment switches 40 and 42 preferably are biased into a raised rest position relative to the housing 39. The preferred embodiment also includes a plurality of two-position control switches. In the illustrated embodiment, control switches 44 and 46 are grouped as one set while control switches 48 and 50 are grouped as a second set. The grouping of the control switches provides a convenient way of having bi-directional adjustment of a function.

It is desirable to reduce the number of switches associated with a graphical user interface system. With previous attempts, however, reducing the number of switches resulted in causing a user to page through a series of menu screens to locate and make adjustments to various functions. The system 20, designed according to this invention, uses a reduced number of switches while also providing the significant advantage of eliminating a driver's need to navigate through a series of menus. Further, this invention allows instant activation of the vehicle subsystems at a single press of a button. The specific arrangement and type of adjustment switches 40, 42 and control switches 44, 46, 48 and 50 provides the ability to easily locate and operate the switches without distracting a driver from the task of driving the vehicle.

The selection switches 36 preferably are arrayed together alongside the display screen 22. Alternatively, the selection switches 36 can be placed on an angled, hand-contoured shelf near the display or on a collar behind the steering wheel, for example. In another embodiment, the selection switches, adjustment knobs and adjustment buttons are supported on the steering wheel for easy access.

Each of the selection switches 36 preferably is a spring-loaded rocker switch. Each selection switch preferably is programmed to activate a single subsystem and, therefore, is dedicated to one subsystem within the vehicle. Having dedicated selection switches 36 provides the ability to label the switches in a manner that makes them readily perceivable by a driver. If the display screen 22 is within a "no-lean reach" of a driver, it is most preferred to place the selection switches 36 along side the display screen 22 generally as illustrated.

Referring now to FIG. 3, one of the selection switches 52, which is dedicated to the radio is labeled with the word "radio." The spring-loaded rocker switch 52 includes a labelled activation surface 54 and a deactivation surface 56 that is labeled with the word "Off." All of the selection switches 36 preferably are programmed such that an initial press of the activation surface causes the electronic controller 24 to instantaneously display the subsystem and its adjustable functions on the display screen 22 and to activate the subsystem according to preselected default settings. Subsequent presses of the activation surface of each selection switch will recall the subsystem display to the screen 22. A subsystem preferably is deactivated by the first press of the deactivation surface. "Initial" press of the activation surface refers to the first time that an activation surface is pressed after the vehicle is turned on.

FIG. 3 illustrates a preferred display 58 on the screen 22 associated with the radio subsystem. The display screen includes a subsystem identifier 59. The illustrated display is divided into four sub-screens or quadrants. Each sub-screen is associated with one of the adjustment switches or a set of control switches. The illustrated multi-purpose adjustment switches 40' and 42' are visual representations on the display screen 22 of the actual adjustment switches 40 and 42, respectively. Similarly, the control switches 44', 46', 48' and 50' are representations on the screen of the actual control switches. In the illustrated embodiment, the adjustment switches and control switches and illustrated on the display screen are arranged in the same order as the physical layout of the adjustment swtiches and control switches on the housing 39, which is strategically located within the vehicle. The correspondence between the physical layout and the display enables a user to readily associate movement of the adjustment switched and control switches with a desired adjustment to the functions of a displayed subsystem. Adjustments made by manipulating the adjustment switches and control switches and preferably are displayed on the screen 22 simultaneously with the control knobs and buttons being manipulated by the driver.

The display 58 preferably includes the entire plurality of adjustable functions associated with the radio subsystem all on one screen. Those functions that can be adjusted by manipulating the adjustment switch 40 are illustrated at 60. Similarly, those control functions that can be adjusted with the adjustment switch 42 are illustrated at 62. A display portion 63 shows the driver a visual representation of an adjustment being made or the current setting for a selected function. The control switches 48 and 50 are dedicated to an adjustable function 64. The display portion 65 visually indicates to the driver the current setting of the function 64 and, simultaneously displays any adjustments made by manipulating the control switches 48 and 50. Similarly, the control switches 44 and 46 are dedicated to an adjustable function 66.

The display screen 22 preferably includes a plurality of icons 68 and 70 that correspond to the vehicle subsystems that can be operated and adjusted through the system 20. The screen icons 68 and 70 preferably appear whenever the display screen 22 is activated. An advantage provided by the screen icons is that each icon corresponds to one of the vehicle subsystems and preferably is located on the screen adjacent to the corresponding selection switch. Further, it is most preferred that the icon corresponding to a selected subsystem be highlighted or otherwise visually distinguished on the screen relative to the remaining icons. This provides the driver an additional visual indication of the selected subsystem. For example, in FIG. 3, the icon 72 is highlighted when the electronic controller 24 recognizes that the activation surface 54 of the selection switch 52 has been pressed.

Figure 4:
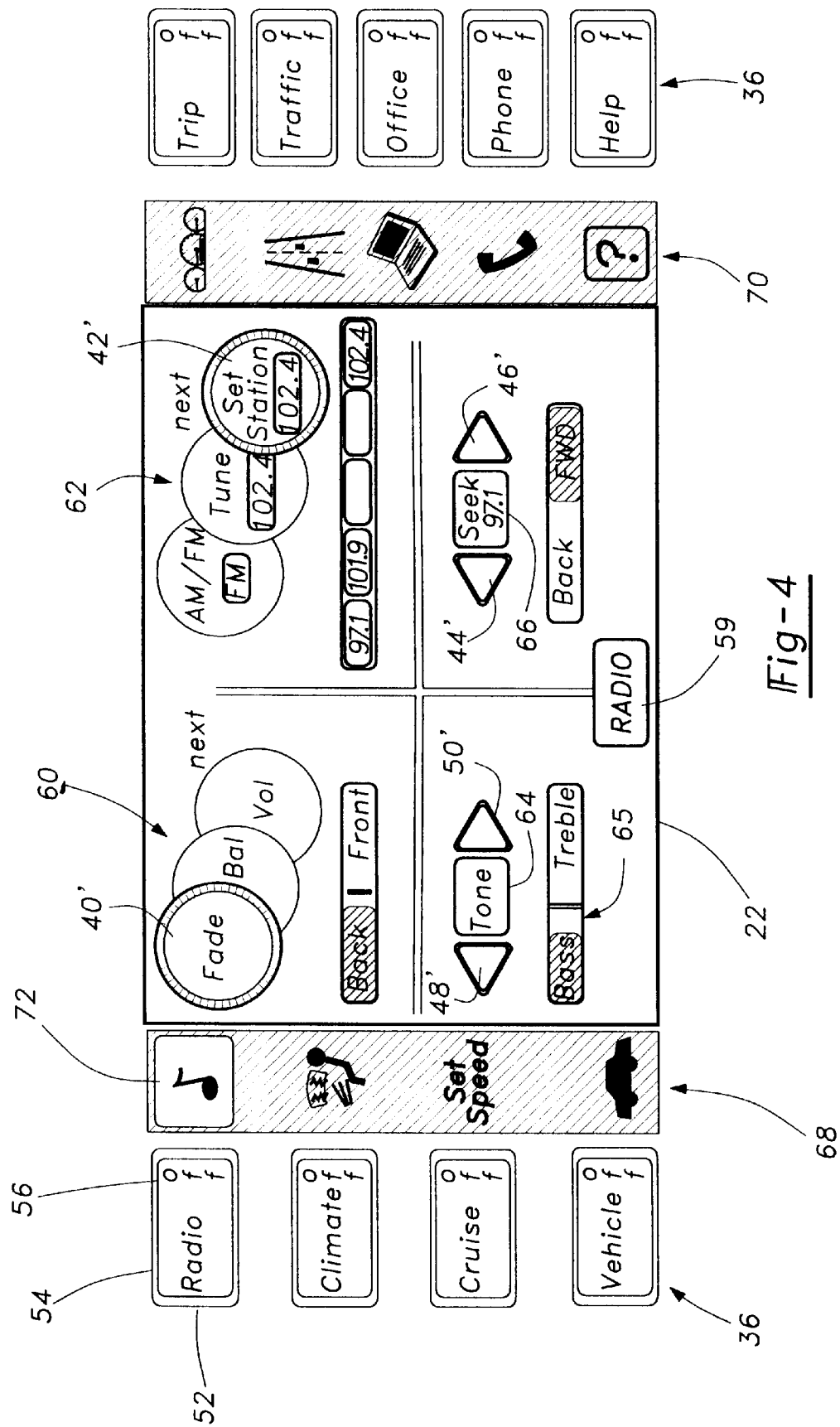
FIG. 4 is a diagrammatic illustration of another screen display associated with this invention.

FIG. 4 illustrates an alternative arrangement of the display from FIG. 3. The primary difference between the embodiments of FIGS. 3 and 4 is the arrangement of information regarding the adjustment switches 40 and 42. For example, FIG. 3 illustrates the functions 60 that can be selected and adjusted by manipulating the adjustment switch 40 within a grouped field. The chosen function is highlighted or otherwise made visually distinct.

FIG. 4 shows a series of overlapping circles 40' that correspond to the adjustment switch 40. The currently selected function preferably is highlighted. Each successive press of the adjustment switch 40 changes the function to be adjusted from among those displayed on the screen. Visual cues such as "next," indicate the results of another push of the adjustment switches. Otherwise, the operation shown in FIG. 4 is the same as FIG. 3.

Figure 5:
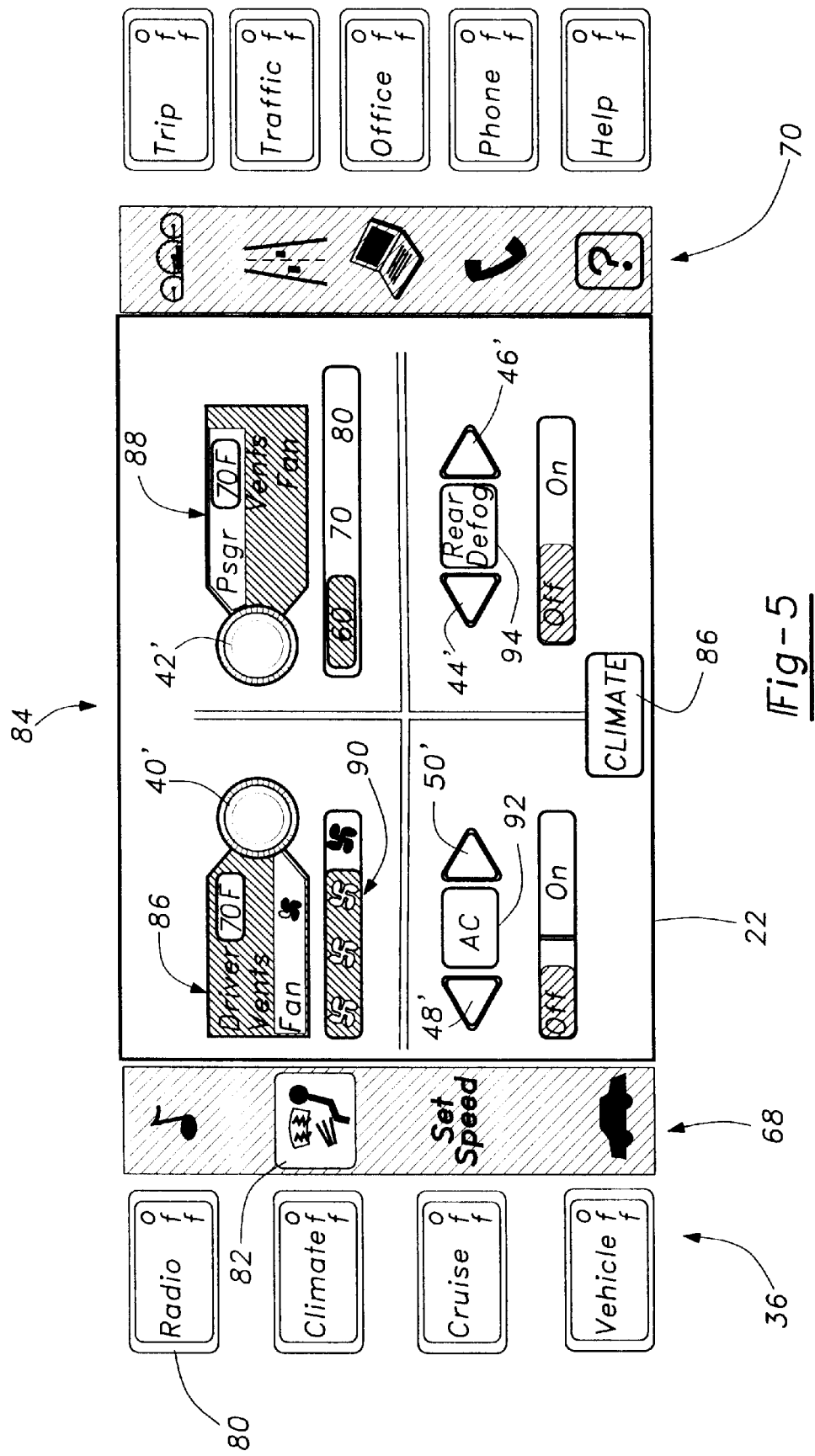
FIG. 5 is a diagrammatic illustration of another screen display associated with this invention.

Referring to FIG. 5, when a driver presses the activation surface of the selection switch 80, the heating, ventilation and air conditioning subsystem (HVAC) icon 82 is highlighted and the display appears on the screen 22. In the illustrated embodiment, a plurality of functions 86 for controlling the climate on the driver side of the vehicle are adjustable using the multi-purpose adjustment switch 40. A plurality of functions 88 for controlling the climate on the passenger side of the vehicle are adjustable by manipulating the adjustment control 42. The display 90 indicates the current level of operation of the fan on the driver side of the vehicle. To increase or decrease the fan speed, the driver simply rotates the adjustment switch 40. If the driver wishes to change the temperature, she simply presses the adjustment switch 40 until the temperature function is highlighted and then rotates the adjustment switch 40 to adjust the temperature in a desired direction. The air conditioning function 92 is dedicated to the control switches 48 and 50. Although the control switches 48 and 50 may be used for increasing and decreasing adjustments of a function, in the illustrated embodiment they are used as on and off switches for subsystems such as the air conditioning. Similarly, the control switches 44 and 46 control whether the rear defogger is on or off.

The adjustment switches 40 and 42 are used to adjust and/or select a plurality of functions associated with different subsystems. For example, manipulating adjustment switch 40 adjusts the volume, balance or fade functions of the radio and the temperature, vent door positions and fan speed of the HVAC subsystem on the driver's side of the vehicle. The adjustment switches, therefore, are very useful in realizing a graphical user interface system designed according to this invention.

Similarly, the control switches 44, 46, 48 and 50 are dedicated to one function for each subsystem. The inventive arrangement of the adjustment switches and control switches therefore, provides system versatility with a relatively small number of switches.

A variety of display screens are available, however, the most visually satisfying displays with a large amount of versatility are achieved by using an electroluminescent display. Therefore, an electroluminescent display is preferred. A variety of microprocessors and microcontrollers are commercially available that will suffice for the electronic controller 24.

The above description is exemplary rather than limiting in nature. For example, a variety of arrangements of selection switches adjustment switches and control switches could be implemented. Similarly, the arrangement of the display on the display screen can be varied from the illustrations discussed above. Those skilled in the art will realize that variations and modifications of the disclosed embodiment will not necessarily depart from the purview and spirit of this invention. Accordingly, the legal scope accorded to this invention can only be determined by studying the appended claims.

What is claimed is:

1. A device for interfacing with an electronic control system, comprising:

a multi-functional adjustment switch that is moveable in a first mode where said adjustment switch is rotated about an axis of rotation and a second mode where said adjustment switch is moved longitudinally along said axis of rotation, wherein the electronic control system makes adjustments responsive to movement of said adjustment switch in said first or second mode;

two control switches that are moveable between an activate position and a rest position, wherein the electronic control system makes adjustments responsive to movement of one or both of said control switches into said activate position; and a display screen located remotely from said adjustment switch and said control switches that displays an image that depicts said adjustment switch and said control switches on said screen with adjustable functions that can be adjusted through manipulation of said adjustment switch and said control switches, respectively.

2. The device of claim 1, further comprising a housing supporting said adjustment switch and control switches and wherein said adjustment switch is biased into a raised position relative to said housing, said adjustment switch being moveable in said first mode when said adjustment switch is in a raised position and moveable in said second mode from said raised position toward said housing along said axis of rotation.

3. The device of claim 2, wherein said control switches are spring-biased into said rest position where said control switches are raised relative to said housing, said control switches being moveable toward said housing into said activate position.

4. The device of claim 1, further comprising a housing supporting said adjustment switch and said control switches in a preselected arrangement where said adjustment switch is spaced a first distance from said control switches and said control switches are spaced from each other a second distance that is smaller than said first distance.

5. The device of claim 4, wherein said adjustment switch is biased into a raised position relative to said housing, said adjustment switch being moveable in said first mode when said adjustment switch is in said raised position and moveable in said second mode from said raised position toward said housing along said axis of rotation.

6. The device of claim 5, wherein said control switches are spring biased into said rest position where said control switches are raised relative to said housing, said control switches being moveable toward said housing into said activate position.

7. The device of claim 6, further comprising a second adjustment switch and a third and fourth control switch, said second adjustment switch being spaced from said third and fourth control switches said first distance and said third control switch being spaced from said fourth control switch said second distance.

8. The device of claim 1, further comprising a housing that supports said multi-functional adjustment switch and said control switches in a preselected arrangement and wherein said image depicts said adjustment switch and said control switches on said screen in said preselected arrangement.

9. A system for controlling a plurality of vehicle subsystems, comprising:

an electronic controller coupled to the subsystems;

a display screen driven by said electronic controller to display a selected one of the vehicle subsystems;

a multi-purpose adjustment switch that communicates with the electronic controller such that the electronic controller selects one of the subsystems and makes adjustments to a selected one of the subsystems responsive to movement of said adjustment switch; and wherein said display includes an image that depicts said adjustment switch on said screen with adjustable functions associated with a selected and displayed subsystem that can be adjusted through manipulation of said adjustment switch.

10. The system of claim 9, further comprising a housing and wherein said adjustment switch is supported on said housing for movement in a first and second mode.

11. The system of claim 10, wherein said all control knob biased into a raised position relative to said housing, said control knob being moveable in said first mode when said control knob is in said raised position and moveable in said second mode from said raised position toward said housing along said axis of rotation.

12. The device of claim 11, further comprising two control switches comprising buttons supported on said housing for movement between rest and activate positions, said buttons being spring biased into said rest position where said control buttons are raised relative to said housing, said control buttons being moveable toward said housing into said activate position.

13. The device of claim 12, further comprising a second control knob and a third and fourth control button, said second control knob being spaced from said third and fourth control buttons said first distance and said third control button being spaced from said fourth button said second distance.

14. The device of claim 10, wherein said electronic controller selects one of a plurality of adjustable functions associated with a selected displayed subsystem responsive to said adjustment switch being moved in said first mode and wherein said electronic controller adjusts a selected one of said of adjustable functions responsive to said adjustment switch being moved in said second mode.

15. The system of claim 9, further comprising two control switches that are in communication with the electronic controller such that movement of one or both of said control switches causes the electronic controller to make adjustments to the selected one of the subsystems.

16. The system of claim 15, further comprising a housing and wherein said adjustment switch is supported on said housing for movement in a first and second mode and said control switches are supported on said housing for movement between rest and activate positions.

17. The system of claim 16, wherein said adjustment switch first mode includes rotating said adjustment switch about an axis of rotation and said second mode includes moving said adjustment switch longitudinally along said axis of rotation, wherein said electronic controller selects a subsystem responsive to movement of said adjustment switch in said second mode and wherein said electronic controller adjusts the selected one of the subsystems responsive to movement of one or both of said control switches into said activate position or movement of said adjustment switch in said first mode.

18. The system of claim 9, further comprising two control switches and a housing that supports, said multi-purpose adjustment switch and said control switches in a preselected arrangement and wherein said image depicts said adjustment switch and said control switches on said screen in said preselected arrangement.

19. A device for interfacing with an electronic control system, comprising:

a multi-function adjustment switch that is moveable in a first mode where said adjustment switch is rotated about an axis of rotation and a second mode where said adjustment is moved longitudinally along said axis of rotation, wherein the electronic control system makes adjustments responsive to movement of said adjustment switch in said first or second mode;

two control switches that are moveable between an activate position and a rest position, wherein the electronic control system makes adjustments responsive to movement of one or both of said control switches into said activate position;

a housing supporting said adjustment switch and said control switches in a preselected arrangement where said adjustment switch is spaced a first distance from said control switches and said control switches are spaced from each other a second distance that is smaller than said first distance; and a display that displays an image of a selected portion of the electronic control system and depicts an image of said adjustment switch and said control switches in said preselected arrangement on said screen with adjustable functions that can be adjusted through manipulation of said adjustment and said control switches, respectively.

20. The device of claim 18, wherein said adjustment switch is biased into a raised position relative to said housing, said adjustment switch being moveable in said first mode when said adjustment switch is in said raised position and moveable in said second mode from said raised position toward said housing along said axis of rotation, and wherein said control switches are biased into said rest position where said control switches are raised relative to said housing, said control switches being moveable toward said housing into said activate position.

* * * * *